US012197603B1

(12) United States Patent
Lominac

(10) Patent No.: US 12,197,603 B1
(45) Date of Patent: Jan. 14, 2025

(54) METHODS AND SYSTEMS FOR TEXTUAL-PATTERN SEARCHING OF DOCUMENTS FOR LOGIN CREDENTIALS

(71) Applicant: Wells Fargo Bank, N.A., San Francisco, CA (US)

(72) Inventor: Ashley Carl Lominac, Concord, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 574 days.

(21) Appl. No.: 17/447,402

(22) Filed: Sep. 10, 2021

(51) Int. Cl.
| | |
|---|---|
| *G06F 7/02* | (2006.01) |
| *G06F 16/00* | (2019.01) |
| *G06F 16/903* | (2019.01) |
| *G06F 16/93* | (2019.01) |
| *G06F 18/21* | (2023.01) |
| *G06F 21/62* | (2013.01) |
| *G06V 30/418* | (2022.01) |
| *G06F 18/00* | (2023.01) |
| *G06F 40/30* | (2020.01) |

(52) U.S. Cl.
CPC .... *G06F 21/6209* (2013.01); *G06F 16/90344* (2019.01); *G06F 16/93* (2019.01); *G06F 18/21* (2023.01); *G06V 30/418* (2022.01); *G06F 18/00* (2023.01); *G06F 40/30* (2020.01)

(58) Field of Classification Search
CPC ................. G06F 21/6209; G06F 16/93; G06F 16/90344; G06F 16/3344; G06F 18/00; G06F 18/21; G06F 40/279; G06F 40/295; G06F 40/30; G06V 30/418; G06V 30/416
See application file for complete search history.

(56) References Cited

U.S. PATENT DOCUMENTS

| | | | |
|---|---|---|---|
| 7,130,885 | B2 | 10/2006 | Chandra et al. |
| 7,310,816 | B1 | 12/2007 | Burns et al. |
| 8,667,603 | B2 | 3/2014 | Brown et al. |
| 8,745,045 | B2 | 6/2014 | Bawri et al. |
| 9,203,650 | B2 | 12/2015 | Malcolm et al. |

(Continued)

OTHER PUBLICATIONS

Gopalji, Varshneya, et al., "Aggregate discovery and retrieval of contents from authenticated interface", Sixth International Conference on Contemporary Computing, (2013), 399-403.

*Primary Examiner* — Bruce M Moser
(74) *Attorney, Agent, or Firm* — SCHWEGMAN LUNDBERG & WOESSNER, P.A.

(57) ABSTRACT

Disclosed herein are embodiments of methods and systems for textual-pattern searching of documents for login credentials. In an embodiment, a computer system obtains a document, and uses a textual-pattern-matching engine to search the document for a portion of the document that matches a contiguous textual search pattern. The contiguous textual search pattern includes a username segment, a proximity segment that is positioned after the username segment in the contiguous textual search pattern, and a password segment that is positioned after the proximity segment in the contiguous textual search pattern. In response to finding at least one portion of the document that matches the contiguous textual search pattern, the computer system takes one or more match-triggered actions such as displaying identified matches, augmenting one or more reports, sending one or more notifications, imposing one or more security measures, and/or the like.

20 Claims, 7 Drawing Sheets

(56) References Cited

U.S. PATENT DOCUMENTS

| | | | |
|---|---|---|---|
| 9,716,721 | B2 | 7/2017 | Hovor et al. |
| 9,813,412 | B1 | 11/2017 | Yang et al. |
| 10,129,298 | B2 | 11/2018 | Grady et al. |
| 10,257,179 | B1 | 4/2019 | Saylor et al. |
| 10,601,844 | B2 | 3/2020 | Parker |
| 10,614,208 | B1 | 4/2020 | Edwards et al. |
| 11,609,893 | B1* | 3/2023 | Anderson ........... G06F 16/2246 |
| 2014/0196129 | A1 | 7/2014 | Amin |
| 2019/0068804 | A1 | 2/2019 | Ichikawa et al. |
| 2022/0309332 | A1* | 9/2022 | V V Ganeshan ........ G06N 3/08 |
| 2022/0319219 | A1* | 10/2022 | Tsibulevskiy ............. G06T 3/60 |
| 2023/0015344 | A1* | 1/2023 | Flanagan ................ G06F 40/30 |

* cited by examiner

METHODS AND SYSTEMS FOR TEXTUAL-PATTERN SEARCHING OF DOCUMENTS FOR LOGIN CREDENTIALS

TECHNICAL FIELD

Among other aspects, the present disclosure relates to security, data-loss prevention, document analysis, and processing of documents using textual search patterns (e.g., regular expressions), and more particularly to methods and systems for textual-pattern searching of documents for login credentials.

BACKGROUND

Billions of people around the world use various different communication and computing devices on a daily basis for many different purposes such as social networking, conducting personal business (e.g., financial transactions), conducting work-related activities, online shopping, browsing the web and/or engaging in other forms of Internet communication for entertainment purposes or to gather the news of the day, and so forth. Indeed, digital communications and computing have become increasingly ubiquitous presences in modern life, and that trend is only expected to continue.

With the increased use and pervasiveness of digital communications and computing comes increased complexity. As an example, a financial-services institution may interact with its customers many billions of times per year in ways such as in person at storefront locations (e.g., banks), online (via, e.g., web portals, mobile applications ("apps"), and/or the like), at automated teller machines (ATMs), on the telephone, and so forth. There are many organizations, such as large, complex, multinational corporations (including financial-services institutions), that operate and manage large, complex information technology (IT) ecosystems for internal operations and also for customer-facing activities, among other purposes. These ecosystems typically contain many different interoperating systems, servers, applications, interfaces, and the like. It is important to such organizations and their customers that these ecosystems operate effectively, reliably, and securely.

One ongoing, seemingly ever-present threat to the continued effective, reliable, and secure operation of these ecosystems—and indeed of many online systems and other resources—is the repeated attempts by nefarious actors to gain access (e.g., log in) to these systems, attempting to appear to such systems to be authorized users. These malicious login attempts are carried out both by people and by programs (e.g., so-called "bots") that these bad actors create or at least use. These attackers, including both people and bots, are persistent, and frequently adjust their attack strategies in an effort to circumvent defensive measures. They often obtain lists that may or may not contain identifiers (e.g., usernames) of authorized users of a system, and their attacks are often aimed at attempting to narrow such lists to identifiers that are associated with valid accounts, which the attackers then try to exploit in some manner. IT teams, fraud-prevention teams, data-loss-prevention (DLP) teams, and others count among their goals to protect their respective ecosystems, and thus their customers, against fraudulent access (e.g., login) attempts and other threats.

BRIEF DESCRIPTIONS OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
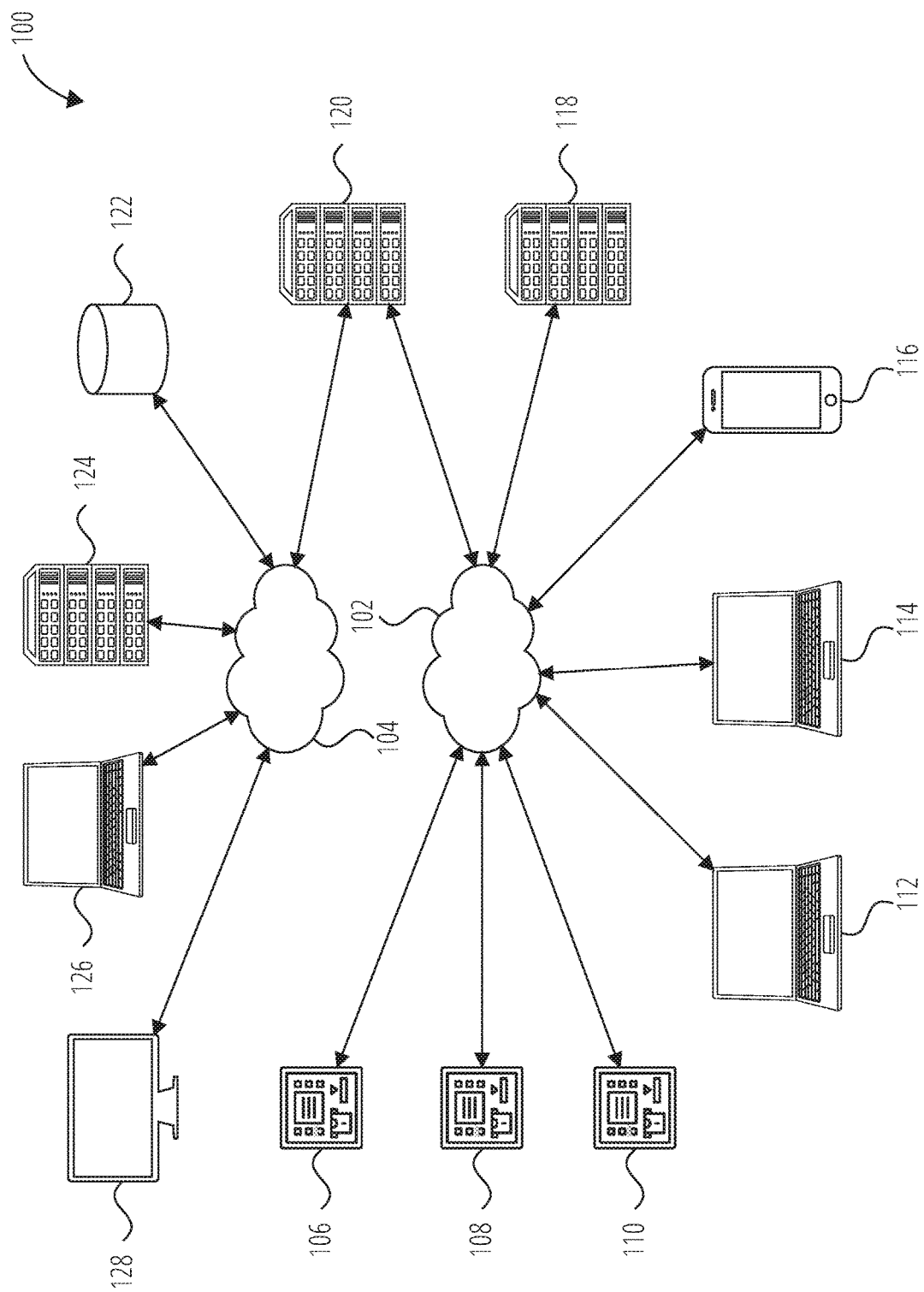
FIG. 1 illustrates an example network arrangement that may be used by an example financial-services institution, in accordance with at least one embodiment.

As mentioned above, there are numerous malicious actors in the world that are seeking to get their hands on valid login credentials (e.g., corresponding {username, password} tuples) of users of myriad types of systems, including systems operated by financial-services institutions. These credentials could be those of employees of the financial-services institution, customers of the financial-services institution, contractors of the financial-services institution, and/or the like. Moreover, while the examples that are primarily described herein relate to financial-services institutions, it should be understood that this is by way of example and not limitation, and that individuals as well as any other types of institutions, organizations, groups, and/or the like would benefit from embodiments of the present disclosure.

It can often occur that a given user that is creating or revising a document (e.g., composing an email, revising a word-processor document, etc.) is perhaps less careful than they could be or should be with their login credentials (and/or with those of one or more other users) to a given system. As used herein, "document" is a broad term that includes examples such as plaintext (a.k.a. "clear text") files, word-processor documents, presentations (e.g., "slide decks"), emails, other types of unstructured data files, and the like. In one example scenario, a user may send another user an email in which the first user provides either their own or the second user's username and password in clear text (e.g., unencrypted) in the email. In another example, a user may type the username and password of one or more accounts into a document, and then store that document on, e.g., a network drive, or the user may attach that document to an email, and so forth.

If a malicious actor obtains a given user's username or password (but not both), that is certainly a problem worth addressing. It is significantly more problematic, however, if a malicious actor obtains both a valid username and valid password of a given user for a given system. Placing both pieces of information together in a given document is, therefore, not a best practice from a security standpoint—a security risk that is amplified by the given document being a plaintext document.

Accordingly, disclosed herein are embodiments of methods and systems for textual-pattern searching for login credentials. As is known in the art, one commonly used type of textual search pattern is known as a "regular expression" (or "regex," for short). In embodiments of the present disclosure, a textual search pattern is a string of characters that specifies a search pattern that can be used on, for example, a single document, a corpus of documents, and/or the like. In an embodiment, a three-segment structure is implemented within a single textual search pattern: a username segment, a proximity segment, and a password segment. In various different embodiments, a single textual search pattern is formed by concatenating the username segment, the proximity segment, and the password segment in left-to-right order. In at least one embodiment, the username segment and proximity segment are separated by at least one character or term in the textual search pattern. Similarly, in at least one embodiment, the proximity segment and the password segment are separated by at least one character or term in an implemented textual search pattern.

In most of this written description, regular expressions (a.k.a. "regexes") are the example types of textual search patterns that are described by way of example. In general, however, any suitable type of textual search pattern can be used in implementing embodiments of the present disclosure. Besides regexes, some example types of textual search patterns include basic regular expressions, extended regular expressions, and Perl-compatible regular expressions (PCRLs), the latter of which is further discussed below in connection with various examples. Moreover, various different embodiments use textual search patterns developed using any one or more of the following:

- a String-Oriented Symbolic Language (SNOBOL) language;
- the Icon Language;
- symbolic expressions (i.e., "Ess Expressions") in Lisp-type languages;
- finite state machines (FSMs);
- finite-state intersection grammars;
- parsing expression grammars (PEGs);
- the parse mode of the Relative Expression-Based Object Language (REBOL);
- augmented Backus-Naur form (ABNF); and
- probability-based parsing.

It is explicitly noted that the above list is intended to be illustrative but not comprehensive.

The username segment may specify a search pattern that includes what is referred to herein as a "precursor" (or "precursor word," etc.) that indicates that an actual username may be present in close proximity after the precursor. Such a precursor in this disclosure is referred to at times as a "username precursor" (or "username-precursor word," etc.). As used in this disclosure, a username-precursor word could include more than one actual word (i.e., it could be a short phrase). For example, "user name" could be a username-precursor word, as could "username," "user identifier," " "login," and so forth. The username segment may further look for (i.e., specify in the search pattern) a delimiter—that is referred to herein at times as a "username delimiter"—following the username precursor, and may further look for an actual username following the username delimiter. The username may be referred to herein at times using terms such as "username string," "username character string," "username-string segment," and/or the like. Many different types of delimiters could be specified, one example of which is a colon (:), another example of which is an equals sign (=), and yet another example of which is a particular word such as "is," "equals," or the like.

The proximity segment may specify that no more than a certain number of characters be present between the username segment and the password segment. In some embodiments, a proximity parameter equal to or on the order of 150 characters is used. The password segment may have a structure that is similar to that of the username segment. As such, the password segment may specify a sequence of a "password precursor" (or "password-precursor word," etc.), a delimiter such as those that are discussed above (and referred to herein at times as a "password delimiter"), and an actual password (referred to herein at times using terms such as "password string," "password character string," "password-string segment," and/or the like).

Returning now to using regexes as an example type of textual search pattern to illustrate examples of embodiments of the present disclosure, in various different implementations, a given document that is being examined using a regex in accordance with embodiments of the present disclosure could be a document that is "at rest" or "in motion." As used herein, a "document at rest" refers generally to a document that is residing in a given storage location at the time that it is being examined. In other words, the document is not—at least at that moment—being transmitted from one location to another. Examples of such storage locations include a folder on a network drive, a folder on a cloud account, and the like. Moreover, as used herein, a "document in motion" is one that is being actually transmitted from one location to another at the time that it is being examined (e.g., at least temporarily held up to be examined). Examples of documents in motion include sent emails, sent-email attachments, documents being sent via an instant messaging application, documents being uploaded to or downloaded from a server, and so forth.

In many examples, the type of analysis that is conducted when examining a given document is quite similar whether the document happens to be at rest or in motion. In some cases, the response to identifying a document that contains at least one text sequence that matches the regular expression may differ depending on whether the document is at rest or in motion. As examples, a matching document at rest may be listed on a report, may have its filename altered in some way (e.g., prepended with a sequence such as "review—") so that it can be more easily found (for further review) using a search and/or sort function, may have a metadata security property set to a certain value (e.g., password protected), may be encrypted, may have its permissions changed such that it can only be accessed by certain personnel, and/or the like. A matching document in motion may be quarantined, discarded, returned (e.g., "bounced back") to the sender, and/or the like. Some matching documents in motion could be encrypted before being sent on their way to make them less likely to be compromised. And certainly many other responsive actions could be taken and will occur to those of skill in the art having the benefit of this disclosure.

One embodiment takes the form of a method that is performed by a computer system executing instructions on at least one hardware processor. The method includes obtaining a document, and also includes using a textual-pattern-matching engine to search the document for a portion of the document that matches a contiguous textual search pattern. The contiguous textual search pattern includes a username segment, a proximity segment that is positioned after the username segment, and a password segment that is positioned after the proximity segment. The method also includes taking one or more match-triggered actions in response to finding at least one portion of the document that matches the contiguous textual search pattern.

As described herein, one or more embodiments of the present disclosure take the form of methods that include multiple operations. One or more other embodiments take the form of systems that include at least one hardware processor and that also include one or more non-transitory computer-readable storage media containing instructions that, when executed by the at least one hardware processor, cause the system (e.g., the at least one hardware processor) to perform multiple operations (that in some embodiments do and in other embodiments do not correspond to operations performed in a herein-disclosed method embodiment). Still one or more other embodiments take the form of one or more non-transitory computer-readable storage media (CRM) containing instructions that, when executed by at least one hardware processor, cause the at least one hardware processor to perform multiple operations (that, similarly, in some embodiments do and in other embodiments do not correspond to operations performed in a herein-disclosed method embodiment and/or operations performed by a herein-disclosed system embodiment).

Furthermore, a number of variations and permutations of embodiments are described herein, and it is expressly noted that any variation or permutation that is described in this disclosure can be implemented with respect to any type of embodiment. For example, a variation or permutation that is primarily described in this disclosure in connection with a method embodiment could just as well also or instead be implemented in connection with a system embodiment and/or a CRM embodiment. Furthermore, this flexibility and cross-applicability of embodiments is present in spite of any slightly different language (e.g., processes, methods, methodologies, steps, operations, functions, and/or the like) that may be used in the present disclosure to describe and/or characterize such embodiments and/or any element or elements thereof. Lastly, it is explicitly noted that, although often used as an abbreviation for the three-word phrase "computer-readable medium (or media)," "CRM" is used in this disclosure as an abbreviation for "one or more non-transitory computer-readable storage media."

FIG. 1 illustrates an example network arrangement 100 that may be employed by an example financial-services institution, in accordance with at least one embodiment. The network arrangement 100 is provided here by way of example and not limitation, as a network arrangement used by a given financial-services institution could have different numbers, types, and/or arrangements of devices, systems, networks, and/or the like. Moreover, the present disclosure is not limited in applicability to financial-services institutions: embodiments of the present disclosure could be applied by one or more individuals, groups, and/or in the context of one or more other types of organizations.

In the network arrangement 100, a number of different devices, systems, and the like are communicatively connected via respective communication links with a public network 102 and/or a private network 104. The devices, systems, etc. that are depicted as being connected to the public network 102 include an ATM 106, an ATM 108, an ATM 110, a laptop computer 112, a laptop computer 114, a mobile device 116, an external server system 118, and a gateway server system 120. In the network arrangement 100, the gateway server system 120 is also communicatively connected with the private network 104, as are a database system 122, an internal server system 124, a laptop computer 126, and a desktop computer 128. In at least one embodiment, only a subset of the devices, systems, and networks that are depicted in FIG. 1 are operated and managed by the aforementioned example financial-services institution. An example such subset includes the private network 104, the ATM 106, the ATM 108, the ATM 110, the gateway server system 120, the database system 122, the internal server system 124, the laptop computer 126, and the desktop computer 128. And certainly additional and/or different devices, systems, and/or the like could be connected with the public network 102 and/or the private network 104.

The public network 102 could be a data-communication network such as, including, or in communication with the Internet, and could operate according to a suite of communication protocols such as the Transmission Control Protocol (TCP) over the Internet Protocol (IP) (collectively, TCP/IP), the User Datagram Protocol (UDP) over IP (UDP/IP), and/or others. Moreover, the example financial-services institution could operate the private network 104 as a private IP network. The gateway server system 120 could, perhaps in addition to other functions, provide network-access-server (NAS) functions, gateway services, firewall protections, and/or the like for the private network 104 with respect to the public network 102. Any of the devices in communication with the public network 102, such as one or more of the ATM 106, the ATM 108, the ATM 110, the laptop computer 112, the laptop computer 114, the mobile device 116, and the external server system 118, could communicate via the public network 102 and the gateway server system 120 with one or more entities on the private network 104, in some cases doing so via a virtual private network (VPN) and/or another type of secure-tunneling communication protocol, connection, and/or the like.

Any of the devices, systems, and the like that are depicted in FIG. 1 and/or in any of the other figures could have a hardware architecture similar to that depicted in and described below in connection with the example computer system 600 of FIG. 6 and could contain and execute software having a software architecture similar to that depicted in and described below in connection with the example software architecture 702 of FIG. 7. Moreover, any of the communication links depicted in FIG. 1 and/or in any of the other figures could be or include one or more wired-communication links (e.g., Ethernet, fiber optic, Universal Serial Bus (USB), and/or the like) and/or one or more wireless-communication links (e.g., Wi-Fi, LTE, NFC, Bluetooth, Bluetooth Low Energy, and/or the like). Any one or more of the communication links could include one or more intermediate devices such as one or more routers, bridges, servers, access points, base stations, and/or the like. Additionally, any communication link could include one or more VPNs and/or other tunneling-type connections.

Moreover, although pictured in FIG. 1 as a data-storage container, the database system 122 could include—in addition to one or more data-storage containers, devices, units, and/or the like—one or more database servers that operate to serve requests to carry out database operations with respect to the database system 122, where such database operations could include retrieving data, extracting data, modifying data, updating data, removing data, and/or the like. Moreover, although the database system 122 is shown as being at a single network location in the network arrangement 100, the database system 122 could include multiple different servers, data silos, and/or the like in multiple different geographic and/or network-topology locations. Those of skill in the art having the benefit of the present disclosure will understand that the example network arrangement 100 could be varied in many other ways in addition to and/or instead of one or more of the ways mentioned herein.

Figure 2:
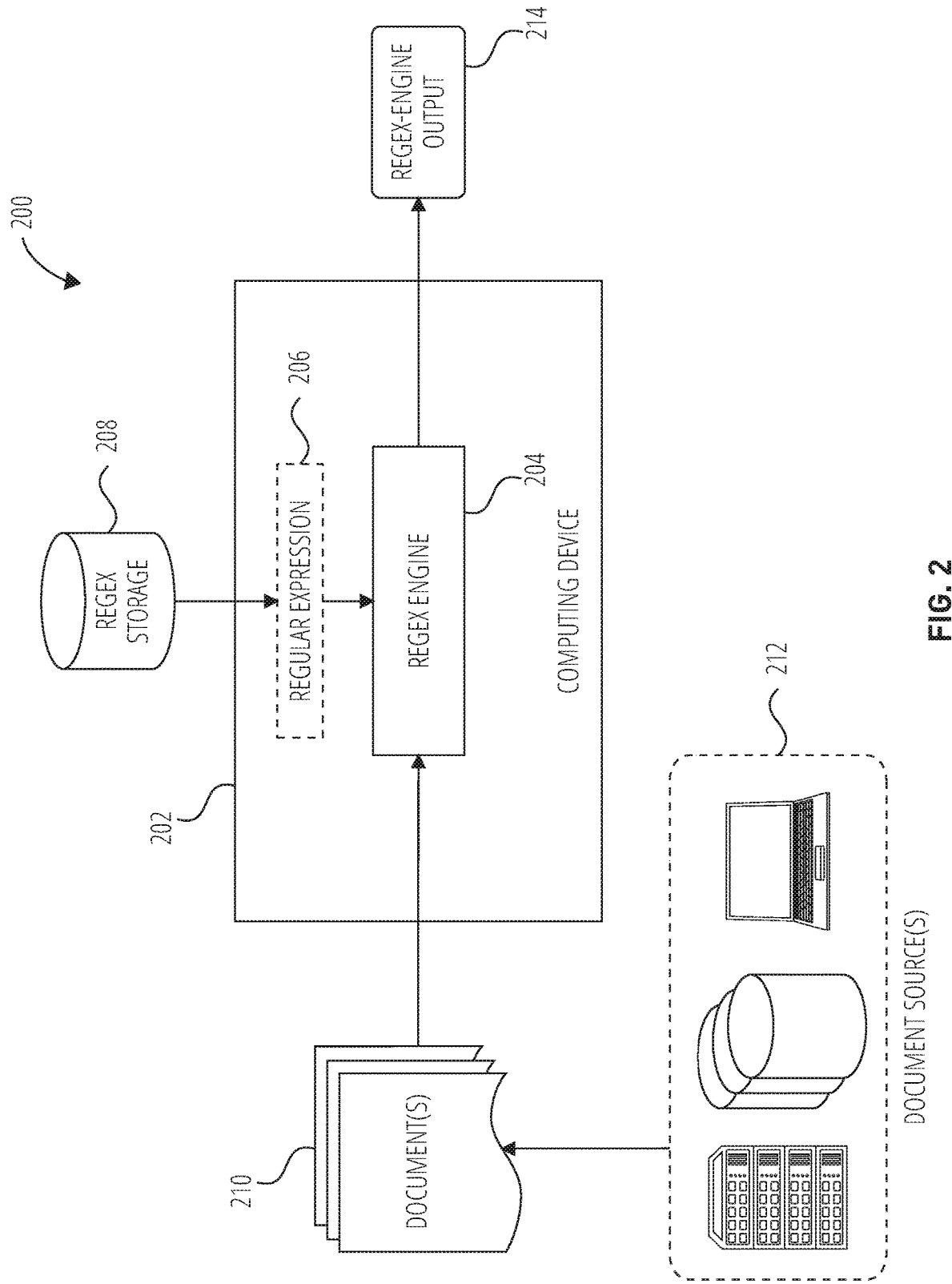
FIG. 2 illustrates an example information-flow diagram, in accordance with at least one embodiment.

FIG. 2 illustrates an example information-flow diagram 200, in accordance with at least one embodiment, it which it can be seen that a computing device 202 includes a regular-expression engine 204. Although any suitable type of textual pattern matching could be used in various different embodiments of the present disclosure, the examples described in connection with FIG. 2 and the ensuing figures are largely presented in terms of regular expressions. This is for illustration and not by way of limitation.

Figure 6:
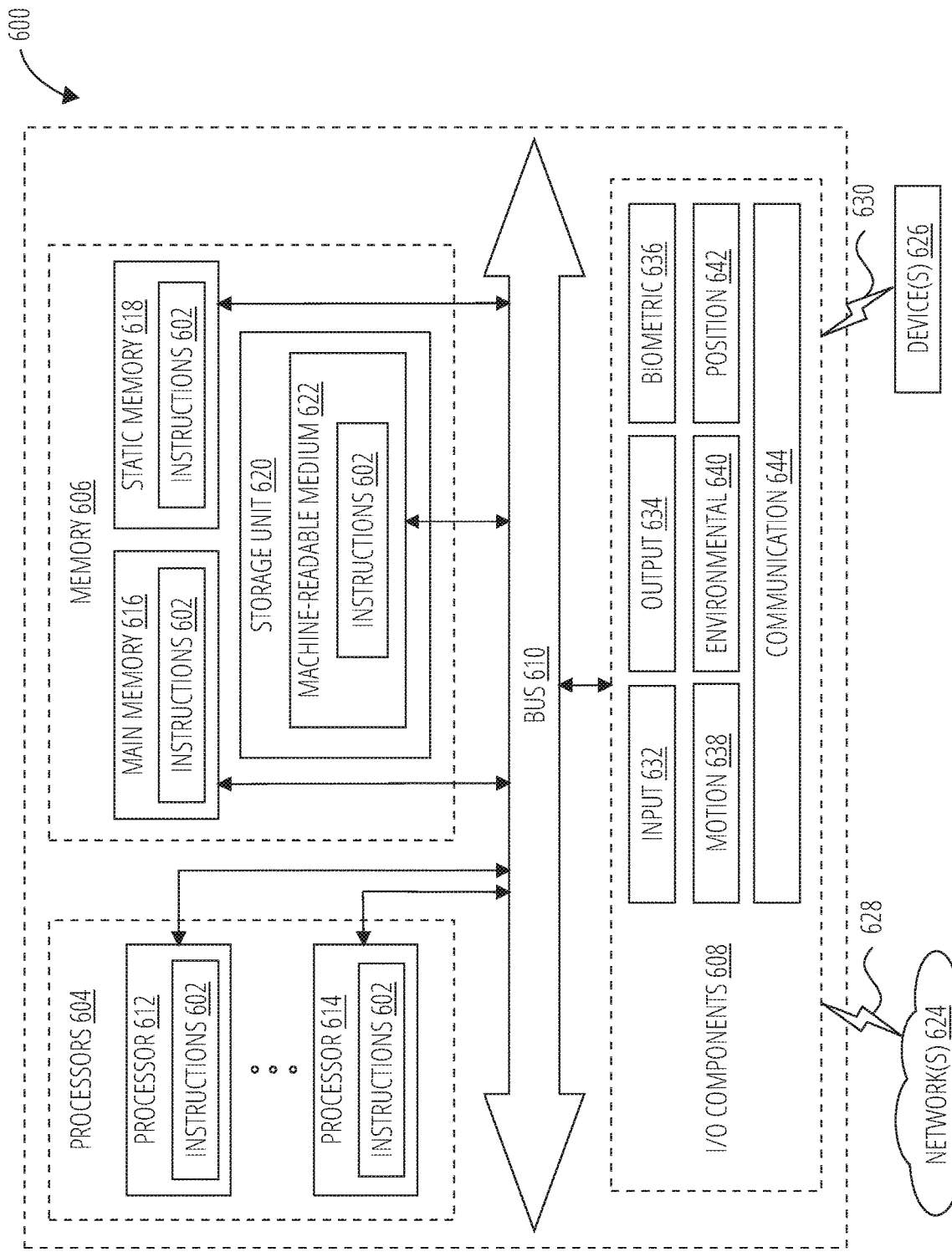
FIG. 6 depicts an example computer system, in accordance with at least one embodiment.
Figure 7:
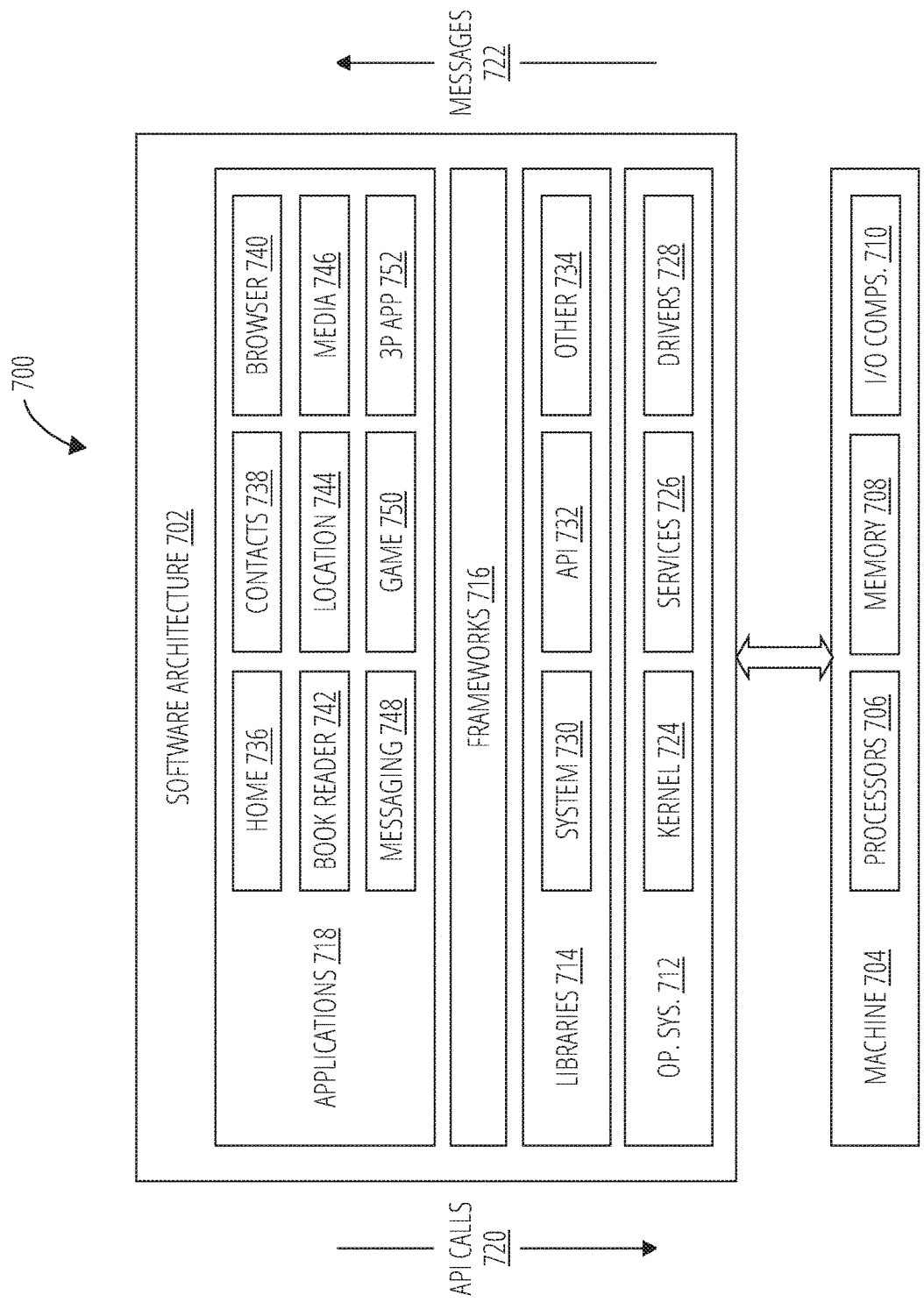
FIG. 7 depicts an example software architecture that could be executed on the example computer system of FIG. 6, in accordance with at least one embodiment.

The computing device 202 could be a computing device similar to the computer system 600 that is depicted in FIG. 6, and could have a software architecture of the type that is depicted as the software architecture 702 in FIG. 7. The regular-expression engine 204 could be implemented as software and/or firmware executing on hardware, and also can be implemented as hardware. As shown in FIG. 2, the regular-expression engine 204 receives one or more documents 210 from one or more document sources 212. Most of the examples that are described herein involve examination of one document 210 at a time, though multiple documents 210 could be examined in parallel, among other options.

Each of the documents 210 could be a plaintext document such as a text file, the body of an email, an email attachment, a text message, a word-processor document, a presentation, a spreadsheet, and/or the like. The one or more document sources 212 could include one or more servers, one or more databases, one or more computers (such as the depicted laptop), one or more mobile devices (e.g., smartphone, tablet, netbook, etc.), and/or one or more other document sources of any other type deemed suitable by those of skill in the art for a given implementation or in a given context.

The regular-expression engine 204 is depicted as receiving a regular expression 206 from a regular-expression storage 208, the latter of which could be a database or other computing system or device. In some embodiments, the regular expression 206 is received via a user interface. Among other options, the regular expression 206 could be a Perl Compatible Regular Expression (PCRE). And while a single regular expression 206 is depicted in FIG. 2 by way of example, the regular-expression engine 204 could receive and apply multiple regular expressions 206 to one or more of the documents 210. Moreover, the regular-expression engine 204 is depicted as producing a regular-expression-engine output 214, some options for which are described herein.

Generally speaking, the regular-expression-engine output 214 could represent an action (e.g., an instruction to quarantine a document 210), a report (that may list, e.g., one or more identifiers for one or more documents 210 deemed by the regular-expression engine 204 to match the regular expression 206), a user-interface display (with, e.g., one or more matching portions of the document 210 highlighted or otherwise denoted), and/or the like. Further details regarding some example structures of the regular expression 206, some examples of the internal functioning of the regular-expression engine 204, and forms that the regular-expression-engine output 214 could take are further discussed herein, among other aspects of the present disclosure.

Figure 3:
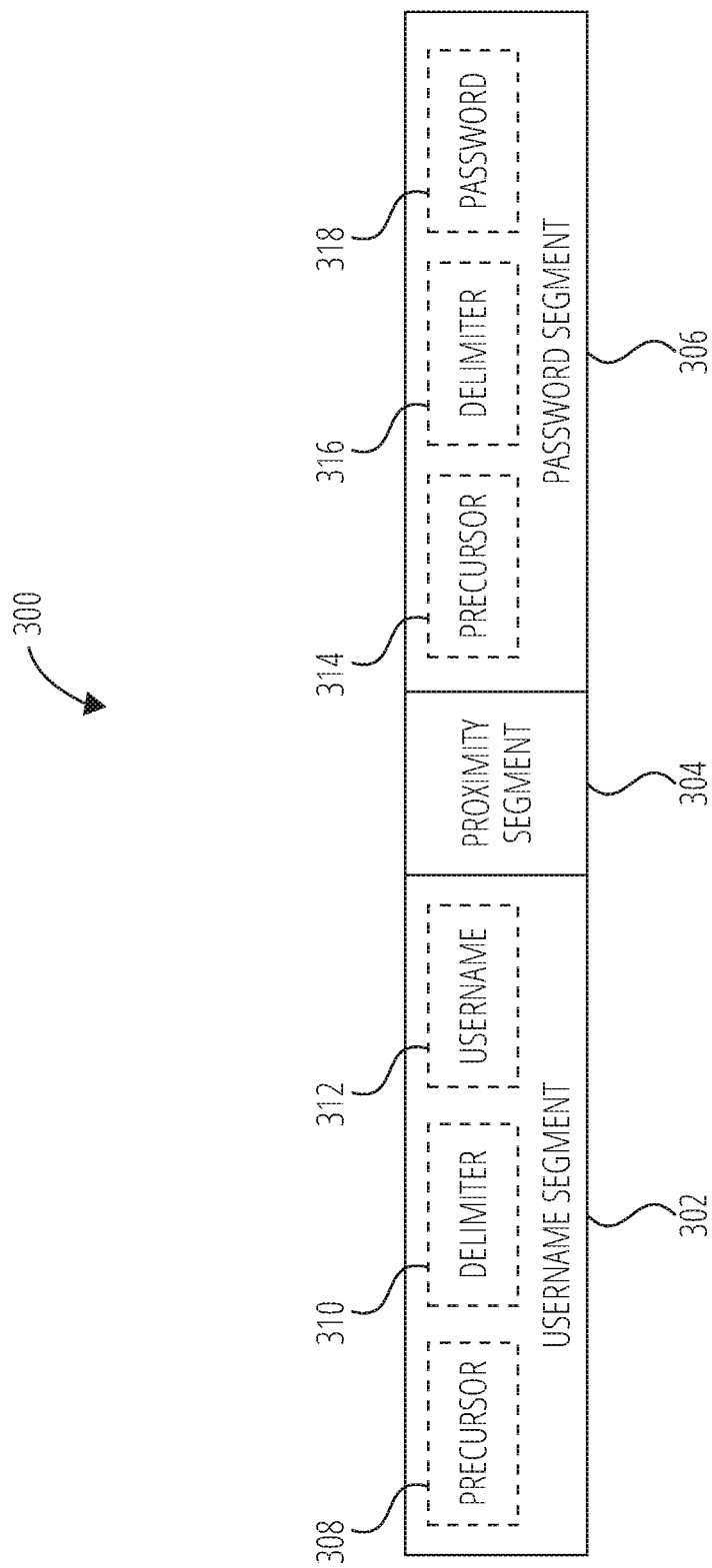
FIG. 3 illustrates a first example regular-expression structure, in accordance with at least one embodiment.

FIG. 3 illustrates an example regular-expression structure 300, in accordance with at least one embodiment. The regular-expression structure 300 includes a username segment 302, a proximity segment 304 that is positioned after the username segment 302, and a password segment 306 that is positioned after the proximity segment 304. It is noted that these segments need not border on one another in the regular-expression structure 300—i.e., there could be one or more segments between the username segment 302 and the proximity segment 304, and/or there could be one or more segments in between the proximity segment 304 and the password segment 306. In most of the examples that are described herein, however, a regular expression is utilized that has the regular-expression structure 300 without intervening terms between the username segment 302 and the proximity segment 304, and also without intervening terms between the proximity segment 304 and the password segment 306.

The username segment 302 includes a username-precursor segment 308, a username-delimiter segment 310 that is positioned after the username-precursor segment 308, and a username-string segment 312 that is positioned after the username-delimiter segment 310. The username-precursor segment 308 may be configured to match a username-precursor word in the document. Some example username-precursor words include "user," "username," "user name," "user ID," "userID," "login," and the like. Thus, the username-precursor segment 308 may be configured to match, in the document, a username-precursor word from among a set of one or more username-precursor words.

The username-delimiter segment 310 may be configured to match a username delimiter in the document. In some embodiments, the username-delimiter segment is configured to match, in the document, a delimiter in a set of one or more delimiters. Some example username delimiters include ":", "–", "-", "—", "→", "=", "is", "are", "equals", etc. Both the username-precursor segment 308 and the username-delimiter segment 310 may be implemented as non-capture groups in the regular-expression structure 300. Furthermore, the username-string segment 312 may be configured to match an actual username in the document. In some embodiments, a username takes the form of a string of characters; in some such cases, the string of characters is one that meets a set of username requirements, rules, or the like. Some example username requirements include that the username be no less than a minimum number of characters, no more than a maximum number of characters, not include any so-called special characters (e.g., $, &, #, etc.), and so forth.

An example of a username segment 302 of an example regex is shown below:

(?i)\b(?:username|login)(?::|:|=|=| is)\s*(?-1)
(?:(?:[^\s\&\; ]{5,50}))

In that example username segment 302, the username-precursor segment 308 is:

\b(?:username|login)

while the username-delimiter segment 310 is (?::|:|=|=| is)

and the username-string segment 312 is (?:(?:[^\s\&\; ]{5,50}))

The start of the username segment 302 being "(?i)" and the end being "(?-i)" indicates that case-insensitive matching is used for the portion of the regex in between those endpoints. This example username-precursor segment 308 of the example username segment 302 will match on either of "username" or "login" as the username-precursor word, and will match on any one of ":", ":" (i.e., a space followed by ":"), "=", "=" (i.e., a space followed by "="), and "is" (i.e., the word "is" followed by a space) as the username delimiter. Moreover, in the above example, the username-string segment 312 corresponds with matching on any string of at least 5 characters and no more than 50 characters up until (but not including) a space, an ampersand, or a semicolon. That string in that run of the regex represents an actual username (or at least a suspected or possible username) such as:

user345 or the like. In some embodiments, the username-string segment 312 is configured to match on a string of characters that meets a given set of username requirements such as requirements that the username is no less than a minimum number of characters, is no more than a maximum number of characters, does not include any special characters, and/or the like.

The proximity segment 304 may be configured to match, in the document, a consecutive sequence of between a minimum-proximity number (e.g., 1) and a maximum-proximity number (e.g., a number on the order of 100, 150, or the like) of characters, inclusive. An example of a proximity segment 304 is:

(?s).{1,150}?(?-s)

In some implementations, the fact that the example proximity segment 304 starts with "(?s)." and ends with "(?-s)" signifies that an option sometimes referred to as a "dot-all" or "dotall" option is being used. When that option is used, the "dot" (.) character, which in a regex typically represents any character other than certain characters such as a newline (\n) or carriage return (\r), does also match on the '\n' and '\r' characters for the processing that occurs after "(?s)." and before (?-s) in the regex. Moreover, in that example, the minimum-proximity number is 1 and the maximum-proximity number is 150.

An example of a password segment 306 of an example regex is shown below:

(?i)\b(?:password|pwd)(?::|:|=|=| is)
(?:(?:[^\s\&\; ]{5,50})))

In that example password segment 306, the password-precursor segment 314 is:

\b(?:password|pwd)

while the password-delimiter segment 316 is:

(?::|:|=|=| is)

and the password-string segment 318 is:

(?:(?:[^\s\&\; ]{5,50})))

As is the case above with respect to the example username segment 302, the start of the password segment 306 being "(?i)" and the end being "(?-i)" indicates that, in this example, case-insensitive matching is used for the portion of the regex in between those endpoints. This example password-precursor segment 314 of the example password segment 306 will match on either of "password" or "pwd" as the password-precursor word, and will match on any one of the delimiters mentioned above with respect to the username-delimiter segment 310, as the username-delimiter segment 310 and the password-delimiter segment 316 are the same in this example, though they need not be. Similarly, the password-string segment 318 is the same as the username-string segment 312 in this example, though again they need not be.

Thus, the password-string segment 318 is configured to match on any string of 5-50 characters that precedes a space, an ampersand, or a semi-colon. That string in that run of the regex represents an actual (or at least suspected or possible) password such as:

G@m3ofThrone$ or the like. In some embodiments, the password-string segment 318 is configured to match on a string of characters that meets a given set of password requirements such as requirements that the password is no less than a minimum number of characters, is no more than a maximum number of characters, includes at least one lowercase letter, includes at least one uppercase letter, includes at least one numerical digit, includes at least one special character, and/or the like. There could also be a requirement that there not be more than two (or some other number of) matching characters in a row, among many other possible password requirements that could be listed here.

In some embodiments, the username-string segment 312 itself includes multiple segments. For example, in some instances, the username-string segment 312 includes what is referred to herein as a username-negative-lookahead segment followed by what is referred to herein as a username-string-selection segment. The latter of those two—i.e., the username-string-selection segment—may be what was described in the above as the (entire) username-string segment 312. That is to say, a username-string-selection segment may specify a text pattern for a character string corresponding to the username. Thus, an example username-string-selection segment is:

(?:(?:[^\s\&\; ]{5,50}))

which matches the above example of an entire username-string segment 312.

Moreover, the username-negative-lookahead segment may itself include one or more sub-tokens that each correspond to a different text pattern that, if found, results in a currently examined portion of the document being deemed to not match the contiguous regular expression 206. One useful aspect of the username-negative-lookahead segment is that there may well be documents 210 in which a user has masked their username with a consecutive sequence of a masking character. Example masking characters include "•", "*", "-", "x", "z", "q", "0", and the like. If a document includes a masked username, that may be considered to be far less of a security risk than a document in which an actual username appears.

An example username-negative-lookahead segment is shown below:

(?![xqzy0_\. •\*]{3,50}

This segment examines from the 3rd to the 50th characters after a located username delimiter to make sure that there is not (using the "?!" syntax) a sequence of between 3 and 50 consecutive bullets, asterisks, dashes, "x" characters, or any of the others specified above or in a given username-negative-lookahead segment of a given username-string segment 312.

In some embodiments, the username-negative-lookahead segment may also include some shorter-length (but common (e.g., default)) passwords that would not be picked up by the {5,50} search that is done in the above example username-string-selection segment of an example username-string segment 312. As an example, "sa" is often the default username and password for SQL implementations. As such, this can be accounted for with a slightly expanded user-name-negative-lookahead segment such as:

(?:sa; |sa|?![xqzy0_\. •\*]{3,50})

which, in addition to matching on a sequence of consecutive repeated (particular) characters as described above, will also match on "sa:" or "sa" appearing after the username delimiter. This is an example of accounting for a special case that presents itself during examination of a number of documents in accordance with embodiments of the present disclosure. Furthermore, characters that may not typically be present in a username can be identified by adding another term, e.g.:

(?:sa; |sa|?![xqzy0_\. •\*]{3,50}|?![#\$ %])

which will consider the appearance of a "#", "$", or "%" (prior to a space, ampersand, or semi-colon due to the above example username-string-selection segment of an example username-string segment 312) to disqualify that particular portion of that document from being a match to the regex.

Similarly, in some embodiments, the password-string segment 318 may include a password-negative-lookahead segment followed by a password-string-selection segment, the latter of which may just be similar to the example password-string segment 318 shown above. Thus, an example password-string-selection segment is:

(?:(?:[^\s\&\; ]{5,50}))

which matches the above example of an entire password-string segment 318. The format and syntax of a password-negative-lookahead segment may be quite similar to that described above in connection with the username-negative-lookahead segment. Thus, it may consider particular short passwords such as "sa;" or "sa" to match, and it may consider the appearance of certain characters prior to a space, ampersand, or semi-colon, for example, to disqualify that portion of the document from being a potential match. Notably, characters such as "#", "$", "%", and/or one or more others may not be included in such a disqualifying group, as those characters are very often allowed (and indeed encouraged) in passwords. An example password-negative-lookahead segment is:

(?:sa; |sa|?![xqzy0_\. •\*]{3,50}|?![\(\)\)><])

where "\ (" and "\)" are escape characters for the characters "(" and ")", respectively. Note that this example includes masking characters similar to those described above in connection with the username-negative-lookahead segment. As with usernames, a masked password is not really a password, so it's not much of a security risk, unlike a plaintext password, of course.

Furthermore, in addition to or instead of a password-negative-lookahead segment, a given password-string segment 318 may include what is referred to herein as a password-negative-lookbehind segment. In many implementations that include both a password-negative-lookahead segment and a password-negative-lookbehind segment, the password-negative-lookbehind segment precedes the password-negative-lookahead segment in the regex structure. Once progress through the regex on a given portion of a document has proceeded past the password delimiter, a password-negative-lookbehind segment can be used to determine whether what is referred to herein as a disqualifying sequence (which could be one or more words, include other characters, and so on) is present at an earlier point in the portion of the document that is currently being scanned.

If a disqualifying sequence is found earlier in the document portion being scanned at that time, the currently scanned portion of the document is not deemed to match the regex. Some example disqualifying sequences include "\.unprotect password:", "\.unprotect password:", "\.protect password:", and "\.protect password:", just to name a few. In some cases, this sort of disqualifying sequence can appear in macro code (e.g., Visual Basic (VBA) macro code). An example password-negative-lookbehind segment—that addresses just those four example disqualifying sequences—is shown below:

(?<!\.unprotect password:|\.unprotect password: |\.protect password:|\.protect password:)

Based on trial and error and/or other data-gathering methodologies, many of the lists of alternatives in the regular-expression structure 300 can be revised (e.g., added to, subtracted from, modified, etc.) over time. These lists include:

- username-precursor words in the username-precursor segment 308 (including optionally in multiple different languages);
- username delimiters in the username-delimiter segment 310;
- allowed short-length usernames in the username-negative-lookahead segment (if present);
- disallowed username characters in the username-negative-lookahead segment (if present);
- password-precursor words in the password-precursor segment 314;
- password delimiters in the password-delimiter segment 316;
- allowed short-length passwords in the password-negative-lookahead segment (if present);
- password-masking characters in the password-negative-lookahead segment (if present); and
- disqualifying sequences in the password-negative-lookbehind segment (if present).

Moreover, in some embodiments, the regular-expression structure 300, and in particular the username segment 302, includes what is referred to herein as a same-line segment between the username-delimiter segment 310 and the username-string segment 312. In cases in which the username segment 302 includes a username-negative-lookahead segment, the same-line segment may be placed before the username-negative-lookahead segment. Here is an example same-line segment:

(?=[^\n\r]{5,5})

The function of this same-line segment is to verify that the five characters that come after the detected username delimiter (e.g., ":") do not include a newline character (\n) and also do not include a carriage-return character (\r). If a newline or carriage return is found within those five characters, the regular-expression engine 204 will bail out of that matching attempt in connection with the currently examined portion of the document, and continue processing either another section of a current document (if there is one)) or a next document (if there is one).

The password segment 306 may also or instead include the same or a similar same-line segment between the password-delimiter segment 316 and the password-string segment 318. As with the username segment 302, in the context of a password segment 306 that includes either or both of a password-negative-lookbehind segment and a password-negative-lookahead segment, a same-line segment may be positioned just after the password-delimiter segment 316, prior to any password-negative-lookbehind segment and a password-negative-lookahead segment that is present. A same-line segment just after the password-delimiter segment 316 in the password segment 306 functions to verify, prior to proceeding further, that none of the five characters following the detected password delimiter is a newline or a carriage return.

Putting all of the above examples together (including the most cumulative of those for which several options are presented) gives the following example regular expression 206 (that comports with the regular-expression structure 300):

(?i)\b(?:username|login)(?::|:|=|=| is)
(?=[^\n\r]{5,5})\s*(?:sa; |sa
|?![xqzy0_\. •\*]{3,50}|?![#\$ %])(?−i)
(?:(?:[^\s\&\; ]{5,50}))(?s). {1,150}?(?−s)(?i)
\b(?:password|pwd) (?::|:|=|=| is)
(?=[^\n\r]{5,5})\s*(?<!\.unprotect password:|
\.unprotect password:|\.protect password:|
\.protect password:)(?:sa; |sa|
?![xqzy0_\. •\*]{3,50}|?![\(\)\)><])
(?:(?:[^\s\&\; ]{5,50})))

It is noted that, in at least some embodiments that do not include a same-line segment such as that shown above in either the username segment 302 or the password segment 306, text such as the following would be considered to match the regular expression 206 above.

username:
user345
password:
G@m3ofThrone$

In at least some embodiments that include a same-line segment in both the username segment 302 and the password segment 306 as described above, the four-line text example above would not match the regular expression 206 above. The following text, would match, however:

username: user345
    password: G@m3ofThrone$ as would the following text:

Here's my username: user345 and here is my
    password: G@m3ofThrone$.

Other username-delimiter segments 310 can be developed that include additional delimiter options such as "is", "are", "=", "=", and the like, to capture common conversational forms such as:

My username is user345 and my password is
    G@m3ofThrone$ for the server.

Figure 4:
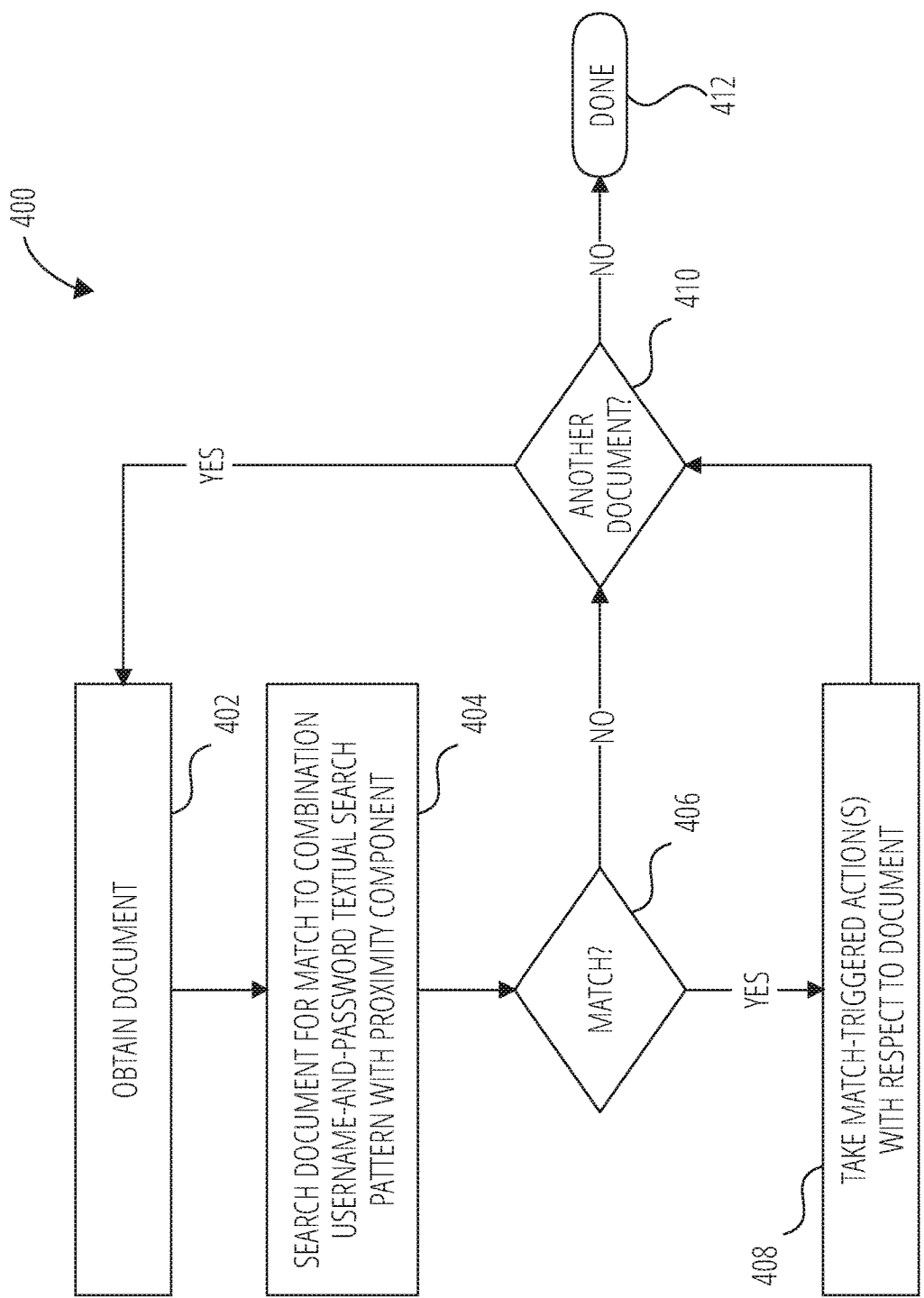
FIG. 4 depicts an example method, in accordance with at least one embodiment.

FIG. 4 illustrates an example method, in accordance with at least one embodiment. Broadly speaking, the method 400 could be performed by any one or any combination of devices, systems, and/or the like that are programmed and/or otherwise arranged to perform the operations described herein. By way of example and not limitation, the method 400 is described herein as being performed by the regular-expression engine 204, which is executing on the computing device 202. Certainly many other possibilities could be listed here as well and will occur to those of skill in the art having the benefit of this disclosure.

As a general matter, various different embodiments of the present disclosure (including the method 400) provide advanced text searching (using a regular expression) of unstructured data (e.g., documents such as emails, word-processor documents, and others as described herein). Advantageously, embodiments of the present disclosure incorporate a username-focused segment and a password-focused segment into a single, contiguous textual search pattern. This approach helps to reduce the occurrence of false positives as compared the multiple-regex approaches that could be used. As such, embodiments of the present disclosure improve the detection accuracy of unencrypted credentials in unstructured data.

Moreover, although not discussed at length in this disclosure, the embodiments that are described could readily be adapted to other contexts in which it is desirable to identify and respond to a {precursor, delimiter, value} sequence for each of multiple, related data items in a given document. One example is the SSID and Wi-Fi password of one or more wireless networks. Another is personal data such as social security number, credit card numbers, bank-account numbers, and so forth. Other examples will occur to those of skill in the art having the benefit of the present disclosure.

Returning now to FIG. 4, the method 400 begins at operation 402 with the regular-expression engine 204 obtaining the document 210. This could be by way of a retrieval from data storage (e.g., sequential processing through files in various folders, directories, etc.), working through a provided queue of documents (e.g., emails and their respective attachments), receiving the document 210 from another computing device, and/or the like. In embodiments of the present disclosure, the document 210 is an unstructured-data document, as described above. The document 210 could be from a data-at-rest storage system or could be a document in motion, which may involve obtaining the document 210 from a communication path via which the document 210 is being transmitted.

At operation 404, the regular-expression engine 204 searches (or the computing device 202 uses the regular-expression engine 204 to search, etc.) the document 210 for a portion of the document 210 that matches the contiguous regular expression 206. Generally speaking, any sort of textual search pattern could be used, and it is only by way of example that regular expressions (and the regular expression 206 in particular) are described here. In various embodiments, the regular expression 206 may be structured according to the regular-expression structure 300 that is described above. Indeed, in this example, the regular expression 206 is the example regex that is provided above near the end of the description of the previous figure.

At decision box 406, the regular-expression engine 204 determines whether the currently examined document includes at least one portion thereof that matches the regular expression 206. If the answer at decision box 406 is "No," then control proceeds to a decision box 410, at which the regular-expression engine 204 determines whether another document is ready (e.g., downloaded, queued, etc.) to be searched/examined as described herein. If so, control returns to operation 402. If not, the method 400 ends at a done block 412. In some embodiments, instead of the done block 412, a polling or waiting function may be implemented such that control keeps looping back to the decision box 410 until the answer there is "Yes," at which point control returns to operation 402.

If, however, the answer at decision box 406 is "Yes," then at operation 408, the regular-expression engine 204 takes (e.g., performs, initiates, causes, and/or the like) one or more of what are referred to in the present disclosure as match-triggered actions in response to finding at least one portion of the document 210 that matches the contiguous regular expression 206. As described above, in at least one embodiment of the present disclosure, such a match occurs in the context of a document 210 that contains, in this order:

1. a username precursor from the username-precursor segment 308 of the regular expression 206 followed by a delimiter from the username-delimiter segment 310 and then a username string captured by the username-string segment 312 of the regular expression 206;
2. all within the proximity range specified by the proximity segment 304 of the regular expression 206; and
3. a password precursor from the password-precursor segment 314 of the regular expression 206 followed by a delimiter from the password-delimiter segment 316 and then a password string captured by the password-string segment 318 of the regular expression 206.

It is briefly noted here that, in at least one embodiment, prior to taking the one or more match-triggered actions, the regular-expression engine 204 searches a remainder of the document 210 for any one or more additional portions of the document that also match the contiguous regular expression 206. In some embodiments, however, one match is enough to take action on that document and the regular-expression engine 204 proceeds to another document.

Examples of match-triggered actions include, with respect to a user associated with an identified username-and-password pair, freezing, blocking, or suspending an associated user's online account (e.g., their ability to log in to check their financial accounts via a website or app provided by the financial institution), alerting the user (via, e.g., a text message or phone call), increasing a required level of authorization (e.g., requiring 2-factor authentication (2FA)), and/or the like.

Other examples of match-triggered actions include:
    displaying each matching portion of the document 210 on a user interface (or at least some of the matching portions, where a user may need to scroll or advance to see later occurrences);

displaying, on the user interface, a content of the document 210 with each matching portion of the document 210 highlighted or otherwise marked, emphasized, noted, and/or the like;

including an identifier of the document 210 in a stored list of identifiers of documents that contain at least one matching portion (which could involve adding the identifier to the stored list, making sure that it's already on the stored list, and/or the like;

including, in a stored list of identified pairs of usernames and passwords, the corresponding username and password from each matching portion in the document (which similarly could involve adding a given username-and-password pair to the list, checking that it's already on the list, etc.);

blocking the document 210 from being transmitted;

at least temporarily quarantining the document 210;

modifying (e.g., heightening) at least one security setting pertaining to authorized access to the document 210;

modifying (e.g., heightening) at least one security setting on an account associated with a username and password;

sending, to at least one user, at least one notification pertaining to finding at least one portion of the document 210 that matches the contiguous regular expression 206;

notifying one or both of a user associated with the username and at least one other user;

notifying an author of the document; and notifying an owner of the document.

Figure 5:
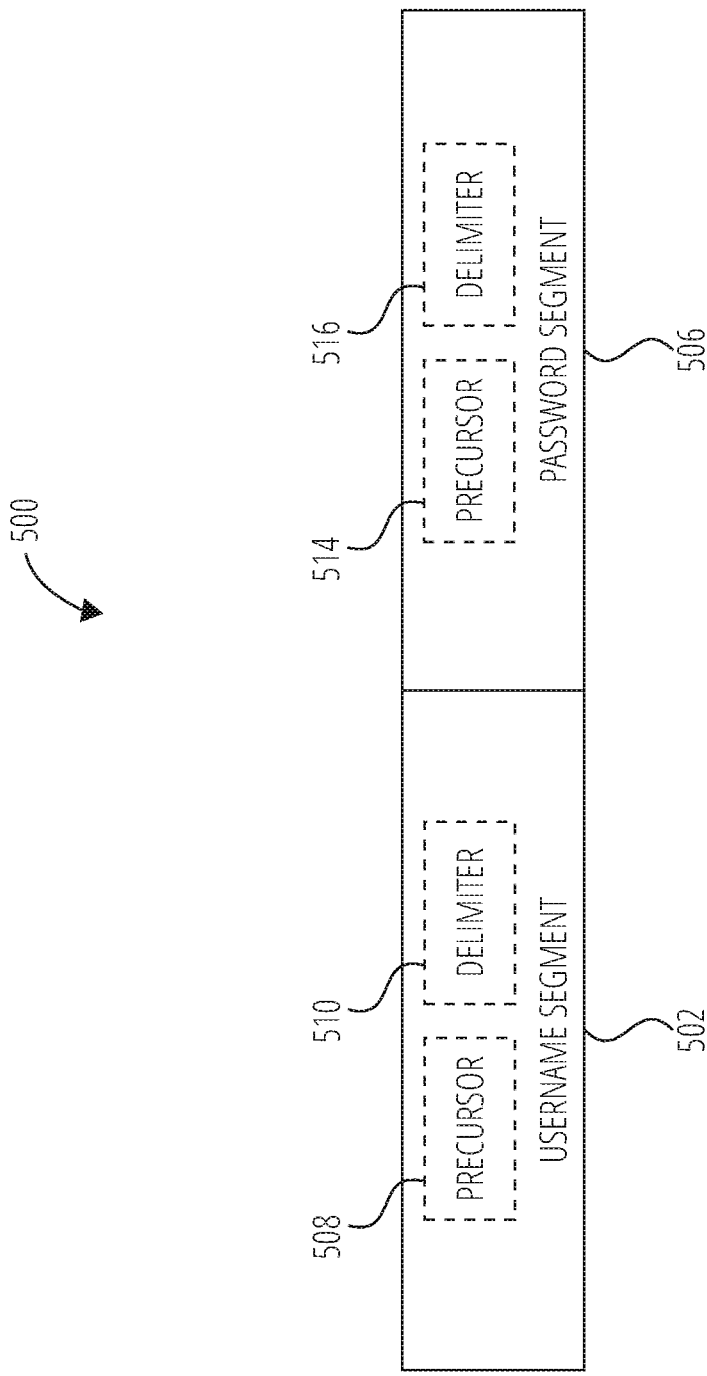
FIG. 5 illustrates a second example regular-expression structure, in accordance with at least one embodiment.

FIG. 5 illustrates an example regular-expression structure 500, in accordance with at least one embodiment. The regular-expression structure 500 that is depicted in FIG. 5 is associated with an alternate approach, referred to herein a tab-delimited approach. The segments present in the regular-expression structure 500 make up a subset of the segments present in the regular-expression structure 300, and thus are not described in detail here. In embodiments of the present disclosure that employ a tab-delimited approach, the regular-expression engine 204 uses a regex that is structured according to or similar to the regular-expression structure 500 of FIG. 5. In at least some such embodiments, documents are not searched for actual usernames and passwords, consistent with the regular-expression structure 500 not including parallels to the username-string segment 312 and the password-string segment 318 of the regular-expression structure 300. Below is an example regex that is structured according to the regular-expression structure 500.

(?i)\t(?:user|user name|username)(?:\:|=|=|)
{0,1}\t(?:password|passwd)(?:\:|=|=|){0,1}\t
(?-i)

This example regex is essentially looking for two horizontally aligned cells (in e.g., a spreadsheet, a table, comma separated values (CSV) file, and/or the like) in which the left-hand cell includes a username precursor and delimiter, and in which the right-hand cell includes a password precursor and delimiter. This order could be reversed, and the delimiters could also be omitted, among other modifications that could be made.

FIG. 6 illustrates an example computer system 600 within which instructions 602 (e.g., software, firmware, a program, an application, an applet, an app, a script, a macro, and/or other executable code) for causing the computer system 600 to perform any one or more of the methodologies discussed herein may be executed. In at least one embodiment, execution of the instructions 602 causes the computer system 600 to perform one or more of the methods described herein. In at least one embodiment, the instructions 602 transform a general, non-programmed computer system into a particular computer system 600 programmed to carry out the described and illustrated functions. The computer system 600 may operate as a standalone device or may be coupled (e.g., networked) to and/or with one or more other devices, machines, systems, and/or the like. In a networked deployment, the computer system 600 may operate in the capacity of a server and/or a client in one or more server-client relationships, and/or as one or more peers in a peer-to-peer (or distributed) network environment.

The computer system 600 may be or include, but is not limited to, one or more of each of the following: a server computer or device, a client computer or device, a personal computer (PC), a tablet, a laptop, a netbook, a set-top box (STB), a personal digital assistant (PDA), an entertainment media system, a cellular telephone, a smartphone, a mobile device, a wearable (e.g., a smartwatch), a smart-home device (e.g., a smart appliance), another smart device (e.g., an Internet of Things (IoT) device), a web appliance, a network router, a network switch, a network bridge, and/or any other machine capable of executing the instructions 602, sequentially or otherwise, that specify actions to be taken by the computer system 600. And while only a single computer system 600 is illustrated, there could just as well be a collection of computer systems that individually or jointly execute the instructions 602 to perform any one or more of the methodologies discussed herein.

As depicted in FIG. 6, the computer system 600 may include processors 604, memory 606, and I/O components 608, which may be configured to communicate with each other via a bus 610. In an example embodiment, the processors 604 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, as examples, a processor 612 and a processor 614 that execute the instructions 602. The term "processor" is intended to include multi-core processors that may include two or more independent processors (sometimes referred to as "cores") that may execute instructions contemporaneously. Although FIG. 6 shows multiple processors 604, the computer system 600 may include a single processor with a single core, a single processor with multiple cores (e.g., a multi-core processor), multiple processors with a single core, multiple processors with multiples cores, or any combination thereof.

The memory 606, as depicted in FIG. 6, includes a main memory 616, a static memory 618, and a storage unit 620, each of which is accessible to the processors 604 via the bus 610. The memory 606, the static memory 618, and/or the storage unit 620 may store the instructions 602 executable for performing any one or more of the methodologies or functions described herein. The instructions 602 may also or instead reside completely or partially within the main memory 616, within the static memory 618, within machine-readable medium 622 within the storage unit 620, within at least one of the processors 604 (e.g., within a cache memory of a given one of the processors 604), and/or any suitable combination thereof, during execution thereof by the computer system 600. In at least one embodiment, the machine-readable medium 622 includes one or more non-transitory computer-readable storage media.

Furthermore, also as depicted in FIG. 6, I/O components 608 may include a wide variety of components to receive input, produce and/or provide output, transmit information, exchange information, capture measurements, and/or the like. The specific I/O components 608 that are included in a particular instance of the computer system 600 will depend on the type of machine. For example, portable machines such as mobile phones may include a touch input device or other such input mechanisms, while a headless server machine may not include such a touch input device. Moreover, the I/O components 608 may include many other components that are not shown in FIG. 6.

In various example embodiments, the I/O components 608 may include input components 632 and output components 634. The input components 632 may include alphanumeric input components (e.g., a keyboard, a touchscreen configured to receive alphanumeric input, a photo-optical keyboard, and/or other alphanumeric input components), pointing-based input components (e.g., a mouse, a touchpad, a trackball, a joystick, a motion sensor, and/or one or more other pointing-based input components), tactile input components (e.g., a physical button, a touchscreen that is responsive to location and/or force of touches or touch gestures, and/or one or more other tactile input components), audio input components (e.g., a microphone), and/or the like. The output components 634 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth.

In further example embodiments, the I/O components 608 may include, as examples, biometric components 636, motion components 638, environmental components 640, and/or position components 642, among a wide array of possible components. As examples, the biometric components 636 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification and/or the like), etc. The motion components 638 may include acceleration-sensing components (e.g., an accelerometer), gravitation-sensing components, rotation-sensing components (e.g., a gyroscope), and/or the like.

The environmental components 640 may include, as examples, illumination-sensing components (e.g., a photometer), temperature-sensing components (e.g., one or more thermometers), humidity-sensing components, pressure-sensing components (e.g., a barometer), acoustic-sensing components (e.g., one or more microphones), proximity-sensing components (e.g., infrared sensors, millimeter-(mm)-wave radar) to detect nearby objects), gas-sensing components (e.g., gas-detection sensors to detect concentrations of hazardous gases for safety and/or to measure pollutants in the atmosphere), and/or other components that may provide indications, measurements, signals, and/or the like that correspond to a surrounding physical environment. The position components 642 may include location-sensing components (e.g., a Global Navigation Satellite System (GNSS) receiver such as a Global Positioning System (GPS) receiver), altitude-sensing components (e.g., altimeters and/or barometers that detect air pressure from which altitude may be derived), orientation-sensing components (e.g., magnetometers), and/or the like.

Communication may be implemented using a wide variety of technologies. The I/O components 608 may further include communication components 644 operable to communicatively couple the computer system 600 to one or more networks 624 and/or one or more devices 626 via a coupling 628 and/or a coupling 630, respectively. For example, the communication components 644 may include a network-interface component or another suitable device to interface with a given network 624. In further examples, the communication components 644 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 626 may include one or more other machines and/or any of a wide variety of peripheral devices (e.g., a peripheral device coupled via a universal serial bus (USB) connection).

Moreover, the communication components 644 may detect identifiers or include components operable to detect identifiers. For example, the communication components 644 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 644, such as location via IP geolocation, location via Wi-Fi signal triangulation, location via detecting an NFC beacon signal that may indicate a particular location, and/or the like.

One or more of the various memories (e.g., the memory 606, the main memory 616, the static memory 618, and/or the (e.g., cache) memory of one or more of the processors 604) and/or the storage unit 620 may store one or more sets of instructions (e.g., software) and/or data structures embodying or used by any one or more of the methodologies or functions described herein. These instructions (e.g., the instructions 602), when executed by one or more of the processors 604, cause performance of various operations to implement various embodiments of the present disclosure.

The instructions 602 may be transmitted or received over one or more networks 624 using a transmission medium, via a network-interface device (e.g., a network-interface component included in the communication components 644), and using any one of a number of transfer protocols (e.g., the Session Initiation Protocol (SIP), the HyperText Transfer Protocol (HTTP), and/or the like). Similarly, the instructions 602 may be transmitted or received using a transmission medium via the coupling 630 (e.g., a peer-to-peer coupling) to one or more devices 626. In some embodiments, IoT devices can communicate using Message Queuing Telemetry Transport (MQTT) messaging, which can be relatively more compact and efficient.

FIG. 7 is a diagram 700 illustrating an example software architecture 702, which can be installed on any one or more of the devices described herein. For example, the software architecture 702 could be installed on any device or system that is arranged similar to the computer system 600 of FIG. 6. The software architecture 702 may be supported by hardware such as a machine 704 that may include processors 706, memory 708, and I/O components 710. In this example, the software architecture 702 can be conceptualized as a stack of layers, where each layer provides a particular functionality. The software architecture 702 may include layers such an operating system 712, libraries 714, frameworks 716, and applications 718. Operationally, using one or more application programming interfaces (APIs), the applications 718 may invoke API calls 720 through the software stack and receive messages 722 in response to the API calls 720.

In at least one embodiment, the operating system 712 manages hardware resources and provides common services. The operating system 712 may include, as examples, a kernel 724, services 726, and drivers 728. The kernel 724 may act as an abstraction layer between the hardware and the other software layers. For example, the kernel 724 may provide memory management, processor management (e.g., scheduling), component management, networking, and/or security settings, in some cases among one or more other functionalities. The services 726 may provide other common services for the other software layers. The drivers 728 may be responsible for controlling or interfacing with underlying hardware. For instance, the drivers 728 may include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 714 may provide a low-level common infrastructure used by the applications 718. The libraries 714 may include system libraries 730 (e.g., a C standard library) that may provide functions such as memory-allocation functions, string-manipulation functions, mathematic functions, and/or the like. In addition, the libraries 714 may include API libraries 732 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in graphic content on a display), database libraries (e.g., SQLite to provide various relational-database functions), web libraries (e.g., WebKit to provide web-browsing functionality), and/or the like. The libraries 714 may also include a wide variety of other libraries 734 to provide many other APIs to the applications 718.

The frameworks 716 may provide a high-level common infrastructure that may be used by the applications 718. For example, the frameworks 716 may provide various graphical-user-interface (GUI) functions, high-level resource management, high-level location services, and/or the like. The frameworks 716 may provide a broad spectrum of other APIs that may be used by the applications 718, some of which may be specific to a particular operating system or platform.

Purely as representative examples, the applications 718 may include a home application 736, a contacts application 738, a browser application 740, a book-reader application 742, a location application 744, a media application 746, a messaging application 748, a game application 750, and/or a broad assortment of other applications generically represented in FIG. 7 as a third-party application 752. The applications 718 may be programs that execute functions defined in the programs. Various programming languages may be employed to create one or more of the applications 718, structured in a variety of manners, such as object-oriented programming languages (e.g., Objective-C, Java, C++, etc.), procedural programming languages (e.g., C, assembly language, etc.), and/or the like. In a specific example, the third-party application 752 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. Moreover, a third-party application 752 may be able to invoke the API calls 720 provided by the operating system 712 to facilitate functionality described herein.

In view of the disclosure above, a listing of various examples of embodiments is set forth below. It should be noted that one or more features of an example, taken in isolation or combination, should be considered within the disclosure of this application.

Example 1 is a method performed by a computer system executing instructions on at least one hardware processor, the method including: obtaining a document; using a textual-pattern-matching engine to search the document for a portion of the document that matches a contiguous textual search pattern, the contiguous textual search pattern including a username segment, a proximity segment that is positioned after the username segment, and a password segment that is positioned after the proximity segment; and taking one or more match-triggered actions in response to finding at least one portion of the document that matches the contiguous textual search pattern.

Example 2 is the method of Example 1, where: the username segment includes a username-precursor segment, a username-delimiter segment that is positioned after the username-precursor segment, and a username-string segment that is positioned after the username-delimiter segment; the username-precursor segment is configured to match a username-precursor word in the document; the username-delimiter segment is configured to match a username delimiter in the document; and the username-string segment is configured to match a username in the document.

Example 3 is the method of Example 2, where: the username-precursor segment being configured to match a username-precursor word in the document includes the username-precursor segment being configured to match, in the document, a username-precursor word from among a set of one or more username-precursor words; the username-delimiter segment being configured to match a username delimiter in the document includes the username-delimiter segment being configured to match, in the document, a delimiter in a set of one or more delimiters; and the username-string segment being configured to match a username in the document includes the username-string segment being configured to match, in the document, a character string corresponding to a username.

Example 4 is the method of Example 3, where: the username-string segment includes a username-negative-lookahead segment followed by a username-string-selection segment; the username-negative-lookahead segment includes one or more sub-tokens that each correspond to a different text pattern that, if found, results in a currently examined portion of the document being deemed to not match the contiguous textual search pattern; and the username-string-selection segment specifies a text pattern for the character string corresponding to the username.

Example 5 is the method of Example 3 or Example 4, where the proximity segment is configured to match, in the document, a consecutive sequence of between a minimum-proximity number and a maximum-proximity number of characters, inclusive.

Example 6 is the method of Example 5, where: the password segment includes a password-precursor segment, a password-delimiter segment that is positioned after the password-precursor segment, and a password-string segment that is positioned after the password-delimiter segment; the password-precursor segment is configured to match a password-precursor word in the document; the password-delimiter segment is configured to match a password delimiter in the document; and the password-string segment is configured to match a password in the document.

Example 7 is the method of Example 6, where: the password-precursor segment being configured to match a password-precursor word in the document includes the password-precursor segment being configured to match, in the document, a password-precursor word from among a set of one or more password-precursor words; the password-delimiter segment being configured to match a password delimiter in the document includes the password-delimiter segment being configured to match, in the document, a delimiter in the set of one or more delimiters; and the password-string segment being configured to match a password in the document includes the password-string segment being configured to match, in the document, a character string corresponding to a password.

Example 8 is the method of Example 7, where: the username-string segment being configured to match a character string corresponding to a username includes the username-string segment being configured to match a character string that satisfies each of one or more username requirements; and the password-string segment being configured to match a character string corresponding to a password includes the password-string segment being configured to match a character string that satisfies each of one or more password requirements.

Example 9 is the method of Example 7 or Example 8, where: the password-string segment includes a password-negative-lookahead segment followed by a password-string-selection segment; the password-negative-lookahead segment includes one or more sub-tokens that each correspond to a different text pattern that, if found in an ensuing part of the currently examined portion of the document, results in the currently examined portion of the document being deemed to not match the contiguous textual search pattern; and the password-string-selection segment specifies a text pattern for the character string corresponding to the password.

Example 10 is the method of Example 9, where: the password-string segment further includes a password-negative-lookbehind segment before the password-negative-lookahead segment; and the password-negative-lookbehind segment includes one or more sub-tokens that each correspond to a different text pattern that, if found in a preceding part of the currently examined portion of the document, results in the currently examined portion of the document being deemed to not match the contiguous textual search pattern.

Example 11 is the method of any of the Examples 1-10, further including, prior to taking the one or more match-triggered actions, using the textual-pattern-matching engine to search a remainder of the document for any one or more additional portions of the document that also match the contiguous textual search pattern.

Example 12 is the method of Example 11, where the one or more match-triggered actions includes displaying each matching portion of the document on a user interface.

Example 13 is the method of Example 12, where displaying each matching portion of the document on the user interface includes displaying, on the user interface, a content of the document with each matching portion of the document highlighted.

Example 14 is the method of any of the Examples 1-13, where the one or more match-triggered actions includes on or both of: including an identifier of the document in a stored list of identifiers of documents that contain at least one matching portion; and including, in a stored list of identified pairs of usernames and passwords, the corresponding username and password from each matching portion in the document.

Example 15 is the method of any of the Examples 1-14, where the one or more match-triggered actions includes one or both of blocking the document from being transmitted and at least temporarily quarantining the document.

Example 16 is the method of any of the Examples 1-15, where the one or more match-triggered actions include one or both of: heightening at least one security setting pertaining to authorized access to the document; and heightening at least one security setting on an account associated with the username and password.

Example 17 is the method of any of the Examples 1-16, where the one or more match-triggered actions includes sending, to at least one user, at least one notification pertaining to finding at least one portion of the document that matches the contiguous textual search pattern.

Example 18 is a computer system including: at least one hardware processor; and data storage containing instructions that, when executed by the at least one hardware processor, cause the computer system to perform operations including: obtaining a document; using a textual-pattern-matching engine to search the document for a portion of the document that matches a contiguous textual search pattern, the contiguous textual search pattern including a username segment, a proximity segment that is positioned after the username segment, and a password segment that is positioned after the proximity segment; and taking one or more match-triggered actions in response to finding at least one portion of the document that matches the contiguous textual search pattern.

Example 19 is the computer system of Example 18, where: the username segment includes a username-precursor segment that is configured to match a username-precursor word in the document, a username-delimiter segment that is positioned after the username-precursor segment and that is configured to match a username delimiter in the document, and a username-string segment that is positioned after the username-delimiter segment and that is configured to configured to match a username in the document; the proximity segment is configured to match, in the document, a consecutive sequence of between a minimum-proximity number and a maximum-proximity number of characters, inclusive; and the password segment includes a password-precursor segment that is configured to match a password-precursor word in the document, a password-delimiter segment that is positioned after the password-precursor segment and that is configured to match a password delimiter in the document, and a password-string segment that is positioned after the password-delimiter segment and that is configured to match a password in the document.

Example 20 is one or more non-transitory computer-readable storage media containing instructions that, when executed by at least one hardware processor of a computer system, cause the computer system to perform operations including: obtaining a document; using a textual-pattern-matching engine to search the document for a portion of the document that matches a contiguous textual search pattern, the contiguous textual search pattern including a username segment, a proximity segment that is positioned after the username segment, and a password segment that is positioned after the proximity segment; and taking one or more match-triggered actions in response to finding at least one portion of the document that matches the contiguous textual search pattern.

Further examples include computer-system, and non-transitory-computer-readable-storage-media embodiments of the method Examples 2-17.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

As used in this disclosure, including in the claims, phrases of the form "at least one of A and B," "at least one of A, B, and C," and the like should be interpreted as if the language "A and/or B," "A, B, and/or C," and the like had been used in place of the entire phrase. Unless explicitly stated otherwise in connection with a particular instance, this manner of phrasing is not limited in this disclosure to meaning only "at least one of A and at least one of B," "at least one of A, at least one of B, and at least one of C," and so on. Rather, as used herein, the two-element version covers each of the following: one or more of A and no B, one or more of B and no A, and one or more of A and one or more of B. And similarly for the three-element version and beyond. Similar construction should be given to such phrases in which "one or both," "one or more," and the like is used in place of "at least one," again unless explicitly stated otherwise in connection with a particular instance.

Furthermore, in any instances in this disclosure, including in the claims, in which numeric modifiers such as "first," "second," "third," etc. are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, one or more components of one or more devices, systems, and/or the like may be referred to in this disclosure as "modules" that perform (execute, carry out, etc.) various operations. If and as used in the present disclosure, a "module" includes both hardware and instructions. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation. In some cases, a module includes at least one functional component (e.g., an application or part of an application, a block of code, and/or the like) executing in whole or in part on one or more hardware processors.

The instructions for a given module are executable by the hardware for carrying out the one or more herein-described operations of the module, and could include hardware (e.g., hardwired) instructions, firmware instructions, software instructions, and/or the like, stored in any one or more non-transitory computer-readable storage media deemed suitable by those of skill in the art for a given implementation. Each such non-transitory computer-readable storage medium could be or include memory (e.g., random access memory (RAM), read-only memory (ROM), erasable programmable read-only memory (EPROM), electrically erasable programmable read-only memory (EEPROM a.k.a. E2PROM), Flash memory, and/or one or more other types of memory) and/or one or more other types of non-transitory computer-readable storage media. A module could be realized as a single component or be distributed across multiple components as deemed suitable by those of skill in the art for a given implementation.

Moreover, consistent with the fact that the entities and arrangements that are described herein, including the entities and arrangements that are depicted in and described in connection with the drawings, are presented as examples and not by way of limitation, any and all statements or other indications as to what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively self-qualified by such a clause. It is for reasons akin to brevity and clarity of presentation that this implied clause is not repeated ad nauseum in this disclosure.

What is claimed is:

1. A method performed by a computer system executing instructions on at least one hardware processor, the method comprising:
    obtaining, from a communication path, a document in motion, wherein the document in motion is being transmitted via the communication path;
    receiving a regular expression;
    applying, using a textual-pattern-matching engine, the regular expression to the document in motion for searching for a portion of the document in motion that matches a contiguous textual search pattern, the contiguous textual search pattern comprising an ordered data structure including a username segment, a proximity segment that is positioned after the username segment, and a password segment that is positioned after the proximity segment; and
    taking one or more match-triggered actions in response to finding at least one portion of the document in motion that includes respective ordered matches to each segment of the ordered data structure of the contiguous textual search pattern, wherein the one or more match-triggered actions include encrypting the document in motion before the document is further transmitted along the communication path.

2. The method of claim 1, wherein:
    the username segment comprises a username-precursor segment, a username-delimiter segment that is positioned after the username-precursor segment, and a username-string segment that is positioned after the username-delimiter segment;

the username-precursor segment is configured to match a username-precursor word in the document;

the username-delimiter segment is configured to match a username delimiter in the document; and the username-string segment is configured to match a username in the document.

3. The method of claim 2, wherein:

the username-precursor segment being configured to match a username-precursor word in the document comprises the username-precursor segment being configured to match, in the document, a username-precursor word from among a set of one or more username-precursor words;

the username-delimiter segment being configured to match a username delimiter in the document comprises the username-delimiter segment being configured to match, in the document, a delimiter in a set of one or more delimiters; and the username-string segment being configured to match a username in the document comprises the username-string segment being configured to match, in the document, a character string corresponding to a username.

4. The method of claim 3, wherein:

the username-string segment comprises a username-negative-lookahead segment followed by a username-string-selection segment;

the username-negative-lookahead segment comprises one or more sub-tokens that each correspond to a different text pattern that, if found, results in a currently examined portion of the document being deemed to not match the contiguous textual search pattern; and the username-string-selection segment specifies a text pattern for the character string corresponding to the username.

5. The method of claim 3, wherein the proximity segment is configured to match, in the document, a consecutive sequence of between a minimum-proximity number and a maximum-proximity number of characters, inclusive.

6. The method of claim 5, wherein:

the password segment comprises a password-precursor segment, a password-delimiter segment that is positioned after the password-precursor segment, and a password-string segment that is positioned after the password-delimiter segment;

the password-precursor segment is configured to match a password-precursor word in the document;

the password-delimiter segment is configured to match a password delimiter in the document; and the password-string segment is configured to match a password in the document.

7. The method of claim 6, wherein:

the password-precursor segment being configured to match a password-precursor word in the document comprises the password-precursor segment being configured to match, in the document, a password-precursor word from among a set of one or more password-precursor words;

the password-delimiter segment being configured to match a password delimiter in the document comprises the password-delimiter segment being configured to match, in the document, a delimiter in the set of one or more delimiters; and the password-string segment being configured to match a password in the document comprises the password-string segment being configured to match, in the document, a character string corresponding to a password.

8. The method of claim 7, wherein:

the username-string segment being configured to match a character string corresponding to a username comprises the username-string segment being configured to match a character string that satisfies each of one or more username requirements; and the password-string segment being configured to match a character string corresponding to a password comprises the password-string segment being configured to match a character string that satisfies each of one or more password requirements.

9. The method of claim 7, wherein:

the password-string segment comprises a password-negative-lookahead segment followed by a password-string-selection segment;

the password-negative-lookahead segment comprises one or more sub-tokens that each correspond to a different text pattern that, if found in an ensuing part of the currently examined portion of the document, results in the currently examined portion of the document being deemed to not match the contiguous textual search pattern; and the password-string-selection segment specifies a text pattern for the character string corresponding to the password.

10. The method of claim 9, wherein:

the password-string segment further comprises a password-negative-lookbehind segment before the password-negative-lookahead segment; and the password-negative-lookbehind segment comprises one or more sub-tokens that each correspond to a different text pattern that, if found in a preceding part of the currently examined portion of the document, results in the currently examined portion of the document being deemed to not match the contiguous textual search pattern.

11. The method of claim 1, further comprising, prior to taking the one or more match-triggered actions, using the textual-pattern-matching engine to search a remainder of the document for any one or more additional portions of the document that also match the contiguous textual search pattern.

12. The method of claim 11, wherein the one or more match-triggered actions comprises displaying each matching portion of the document on a user interface.

13. The method of claim 12, wherein displaying each matching portion of the document on the user interface comprises displaying, on the user interface, a content of the document with each matching portion of the document highlighted.

14. The method of claim 1, wherein the one or more match-triggered actions comprises one or both of:

including an identifier of the document in a stored list of identifiers of documents that contain at least one matching portion; and including, in a stored list of identified pairs of usernames and passwords, the corresponding username and password from each matching portion in the document.

15. The method of claim 1, wherein the one or more match-triggered actions comprises one or both of blocking the document from being transmitted and at least temporarily quarantining the document.

16. The method of claim 1, wherein the one or more match-triggered actions comprise one or both of:

heightening at least one security setting pertaining to authorized access to the document; and heightening at least one security setting on an account associated with the username and password.

17. The method of claim 1, wherein the one or more match-triggered actions comprises sending, to at least one user, at least one notification pertaining to finding at least one portion of the document that matches the contiguous textual search pattern.

18. A computer system comprising:

at least one hardware processor; and data storage containing instructions that, when executed by the at least one hardware processor, cause the computer system to perform operations comprising:

obtaining, from a communication path, a document in motion, wherein the document in motion is being transmitted via the communication path;

receiving a regular expression;

applying, using a textual-pattern-matching engine, the regular expression to the document in motion for searching for a portion of the document in motion that matches a contiguous textual search pattern, the contiguous textual search pattern comprising an ordered data structure including a username segment, a proximity segment that is positioned after the username segment, and a password segment that is positioned after the proximity segment; and taking one or more match-triggered actions in response to finding at least one portion of the document in motion that includes respective ordered matches to each segment of the ordered data structure of the contiguous textual search pattern, wherein the one or more match-triggered actions include encrypting the document in motion before the document is further transmitted along the communication path.

19. The computer system of claim 18, wherein:

the username segment comprises a username-precursor segment that is configured to match a username-precursor word in the document, a username-delimiter segment that is positioned after the username-precursor segment and that is configured to match a username delimiter in the document, and a username-string segment that is positioned after the username-delimiter segment and that is configured to configured to match a username in the document;

the proximity segment is configured to match, in the document, a consecutive sequence of between a minimum-proximity number and a maximum-proximity number of characters, inclusive; and the password segment comprises a password-precursor segment that is configured to match a password-precursor word in the document, a password-delimiter segment that is positioned after the password-precursor segment and that is configured to match a password delimiter in the document, and a password-string segment that is positioned after the password-delimiter segment and that is configured to match a password in the document.

20. One or more non-transitory computer-readable storage media containing instructions that, when executed by at least one hardware processor of a computer system, cause the computer system to perform operations comprising:

obtaining, from a communication path, a document in motion, wherein the document in motion is being transmitted via the communication path;

receiving a regular expression;

applying, using a textual-pattern-matching engine, the regular expression to the document in motion for searching for a portion of the document in motion that matches a contiguous textual search pattern, the contiguous textual search pattern comprising an ordered data structure including a username segment, a proximity segment that is positioned after the username segment, and a password segment that is positioned after the proximity segment; and taking one or more match-triggered actions in response to finding at least one portion of the document in motion that includes respective ordered matches to each segment of the ordered data structure of the contiguous textual search pattern, wherein the one or more match-triggered actions include encrypting the document in motion before the document in motion is further transmitted along the communication path.

\* \* \* \* \*